United States Patent
Bang et al.

(10) Patent No.: US 10,671,123 B2
(45) Date of Patent: Jun. 2, 2020

(54) STRUCTURE FOR DISPLAY DEVICE AND DISPLAY DEVICE INCLUDING THE SAME

(71) Applicant: Samsung Display Co., Ltd., Yongin-si, Gyeonggi-do (KR)

(72) Inventors: Ji Yun Bang, Cheonan-si (KR); Jun Ho Kwack, Geumsan-gun (KR); Jae Young Sim, Anyang-si (KR); Hyun-Woo Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/031,958

(22) Filed: Jul. 10, 2018

(65) Prior Publication Data

US 2019/0138057 A1 May 9, 2019

(30) Foreign Application Priority Data

Nov. 6, 2017 (KR) .......................... 10-2017-0146716

(51) Int. Cl.
*G06F 1/16* (2006.01)
*G02F 1/1333* (2006.01)
*G02F 1/1345* (2006.01)

(52) U.S. Cl.
CPC ........ *G06F 1/1652* (2013.01); *G02F 1/13452* (2013.01); *G02F 1/133308* (2013.01); *G06F 1/1643* (2013.01); *G02F 2001/133314* (2013.01); *G02F 2001/133331* (2013.01); *G02F 2201/56* (2013.01)

(58) Field of Classification Search
CPC .... G06F 1/1652; G06F 1/1643; G06F 1/1626; G06F 1/163; G02F 2201/56
See application file for complete search history.

(56) References Cited

U.S. PATENT DOCUMENTS

| 2009/0009941 A1* | 1/2009 | Hsu | B29C 45/14811 361/679.27 |
| 2014/0147087 A1* | 5/2014 | Lambert | G02B 6/06 385/116 |
| 2015/0103270 A1* | 4/2015 | Tung | H01J 17/49 349/12 |

(Continued)

FOREIGN PATENT DOCUMENTS

| JP | 2014-115705 A | 6/2014 |
| KR | 10-2012-0058747 A | 6/2012 |

(Continued)

*Primary Examiner* — Daniel P Wicklund
*Assistant Examiner* — Christopher L Augustin
(74) *Attorney, Agent, or Firm* — Lewis Roca Rothgerber Christie LLP

(57) ABSTRACT

A structure for a display device and a display device are provided. A structure for a display device includes a surface of which at least a portion thereof is not flat, and another surface that is flat. A display device includes: a display panel; and a structure contacting the display panel, and at least some of a first surface of the display panel may have a first curved shape, the structure may have a second surface contacting the first surface of the display panel, at least a portion of the second surface of the structure may have a second curved shape, and the structure may include a third surface that is opposite the second surface and is flat, and a driver is attached and fixed to the flat third surface of the structure.

24 Claims, 15 Drawing Sheets

(56) References Cited

U.S. PATENT DOCUMENTS

| | | | |
|---|---|---|---|
| 2015/0311960 A1* | 10/2015 | Samardzija | G06F 1/163 455/90.3 |
| 2015/0331451 A1* | 11/2015 | Shin | G06F 3/041 345/173 |
| 2017/0082784 A1* | 3/2017 | Niu | G02B 3/06 |
| 2017/0184775 A1* | 6/2017 | Kang | G02B 6/0045 |
| 2017/0192140 A1* | 7/2017 | Yoon | G02B 5/045 |
| 2017/0229062 A1* | 8/2017 | Zeng | G06F 3/041 |
| 2017/0276977 A1* | 9/2017 | Li | G02F 1/1333 |
| 2017/0293194 A1* | 10/2017 | Hou | G06F 1/1637 |
| 2018/0039127 A1* | 2/2018 | Eom | G02F 1/133308 |

FOREIGN PATENT DOCUMENTS

| | | |
|---|---|---|
| KR | 10-2015-0109743 A | 10/2015 |
| KR | 10-2017-0034999 A | 3/2017 |
| KR | 10-2017-0058126 A | 5/2017 |
| KR | 10-1750009 B1 | 6/2017 |

* cited by examiner (c)

STRUCTURE FOR DISPLAY DEVICE AND DISPLAY DEVICE INCLUDING THE SAME

CROSS-REFERENCE TO RELATED APPLICATION

This application claims priority to and the benefit of Korean Patent Application No. 10-2017-0146716, filed on Nov. 6, 2017 in the Korean Intellectual Property Office, the entire content of which is incorporated herein by reference.

BACKGROUND

1. Field

Aspects of embodiments of the present disclosure relate to a structure for a display device and a display device including the same.

2. Description of the Related Art

As technology has advanced, various portable display devices have been developed.

As the display device is portable, the display device is likely to be easily subjected to impact, and when the impact is applied to the display device, a contact failure between a display panel and a driver for transmitting a driving signal to the display panel is apt to occur, which may cause display defects.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present invention, a structure for a display device and a display device including the structure are provided, in which the structure may support and protect a display panel of the display device and may prevent or substantially prevent a driver from being damaged. According to an aspect of embodiments of the present invention, a structure for a display device, in which the structure may support and protect a display panel of a curved display device, and a display device including the same are provided.

According to one or more exemplary embodiments of the present invention, a structure for a display device includes: a first layer including a first surface, wherein at least a portion of the first surface is not flat; a second layer contacting the first layer; and a third layer contacting the second layer and including a second surface that is flat.

The first layer and the third layer may have adherence.

The portion of the first surface of the first layer may include a plurality of convex portions and a plurality of concave portions, and convex portions of the plurality of convex portions may have a polygonal flat shape.

An edge of at least one of the second layer and the third layer may protrude more than an edge of the first layer.

According to one or more exemplary embodiments of the present invention, a display device includes: a display panel; and a structure contacting the display panel, wherein at least a portion of a first surface of the display panel has a first curved shape, the structure includes a second surface contacting the first surface of the display panel, at least a portion of the second surface of the structure has a second curved shape, and a third surface of the structure that is opposite the second surface is flat.

The first curved shape and the second curved shape may be combinable and opposite to each other.

The display device may further include a driver connected to the display panel, and the driver may contact and be fixed to the third surface of the structure.

According to one or more exemplary embodiments of the present invention, a display device includes: a display portion including a first surface, wherein at least a portion of the first surface is not flat, and a second surface that is flat; and a driver connected to the display portion and adhered and fixed to the second surface.

The display portion may include a display panel and a structure attached to the display panel, the display panel may include the first surface, and the structure may include the second surface.

The structure may include a first layer contacting the display panel, a second layer contacting the first layer, and a third layer contacting the second layer and including the second surface, and an edge of at least one of the second layer and the third layer may protrude more than an edge of the first layer to cover an edge of the display panel.

At least a portion of a surface of the first layer may include a plurality of convex portions and a plurality of concave portions, and convex portions of the plurality of convex portions may have a polygonal flat shape.

The convex portions may have a triangular, quadrangular, or hexagonal flat shape.

According to aspects of embodiments of the present invention, a structure for a display device that may be easily attached to a rear surface of a display panel thereof to support and protect the display panel, and in which a surface to which a driver is attached is flat, such that the driver may be stably attached to prevent or substantially prevent the driver from moving and being damaged according to an external impact, and a display device including the same, may be provided.

DESCRIPTION OF SYMBOLS

Figure 1:
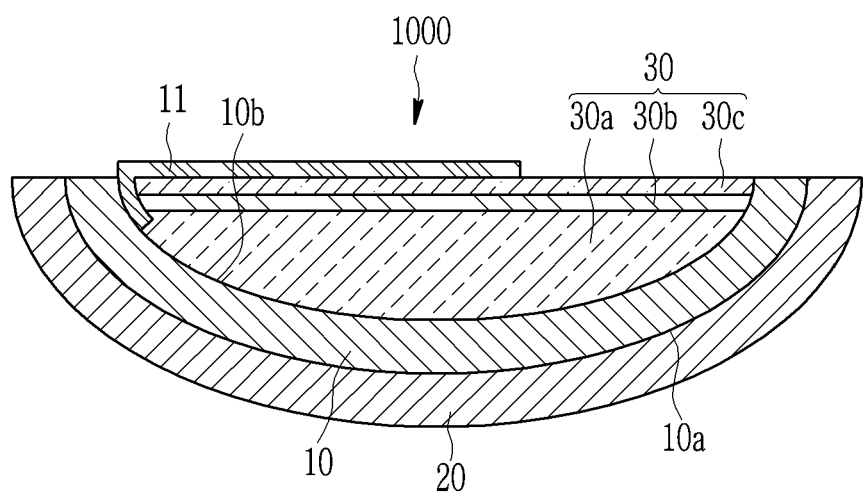
FIG. 1 illustrates a schematic cross-sectional view of a display device according to an exemplary embodiment.

1000: display device
10: display panel,
20: window
30: cover member

DETAILED DESCRIPTION

The present invention will be described more fully herein with reference to the accompanying drawings, in which some exemplary embodiments of the invention are shown. As those skilled in the art would realize, the described embodiments may be modified in various different ways, all without departing from the spirit or scope of the present invention.

To more clearly describe the present invention, portions which do not relate to the description may be omitted, and like reference numerals designate like elements throughout the specification.

Further, the size and thickness of each component shown in the drawings may be arbitrarily shown for better understanding and ease of description, but the present invention is not limited thereto. In the drawings, the thicknesses of layers, films, panels, regions, etc. may be exaggerated for clarity. For better understanding and ease of description, the thicknesses of some layers and areas may be exaggerated.

It is to be understood that when an element, such as a layer, film, region, or substrate is referred to as being "on" another element, it may be directly on the other element or one or more intervening elements may also be present. In contrast, when an element is referred to as being "directly on" another element, there are no intervening elements present. Further, in the specification, the words "on" or "above" mean disposed on or below the object portion, and do not necessarily mean disposed on the upper side of the object portion based on a gravitational direction.

In addition, unless explicitly described to the contrary, the word "comprise" and variations, such as "comprises" or "comprising," are to be understood to imply the inclusion of stated elements, but not the exclusion of any other elements.

Throughout the specification, the phrase "on a plane" means viewing the object portion from the top, and the phrase "on a cross-section" means viewing a cross-section of which the object portion is vertically cut from the side.

Figure 2:
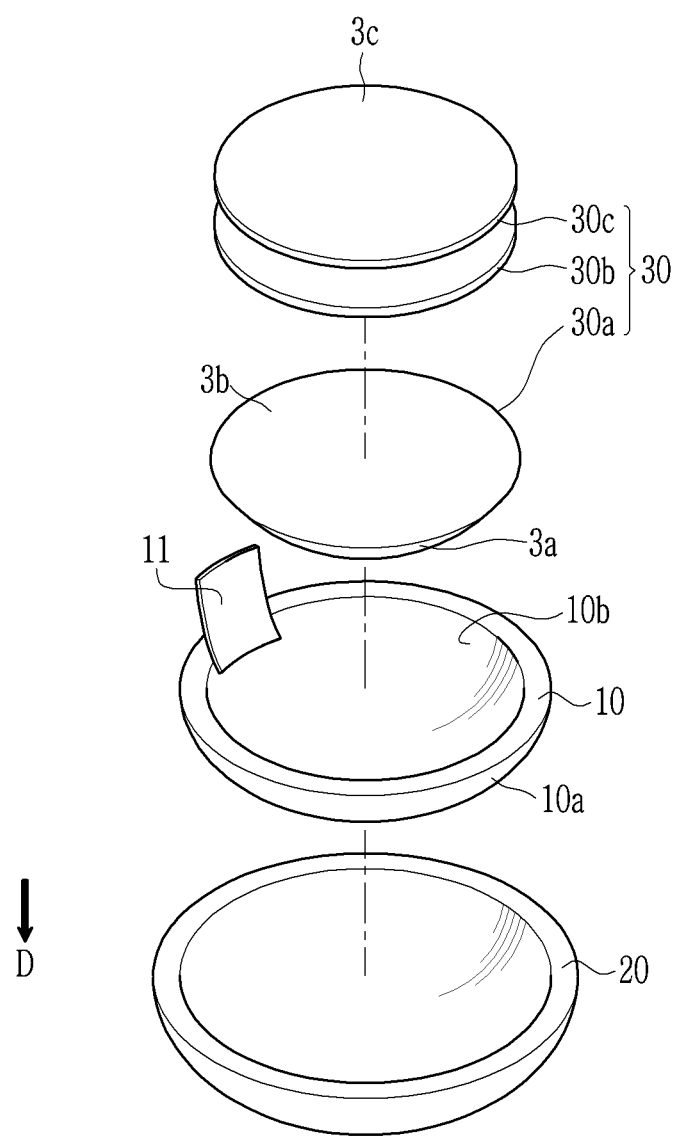
FIG. 2 illustrates an exploded perspective view of the display device of FIG. 1.
Figure 3A:
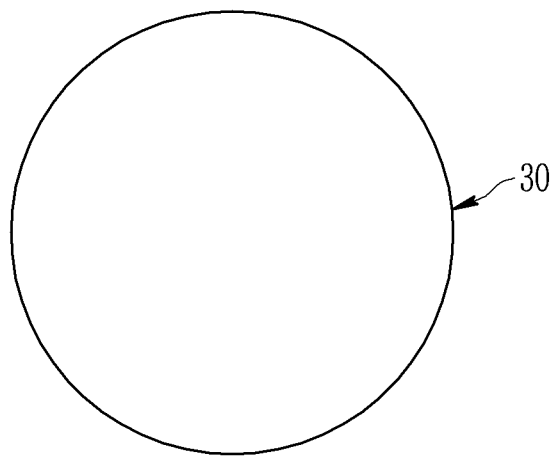
FIGS. 3A, 3B, and 3C illustrate schematic top, cross-sectional, and perspective views, respectively, of a structure of the display device of FIG. 1.
Figure 3B:
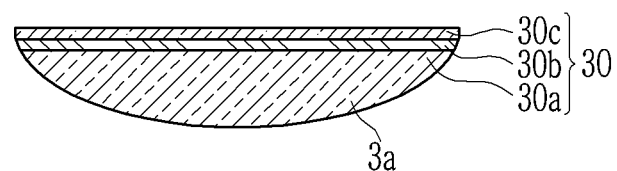
Figure 3C:
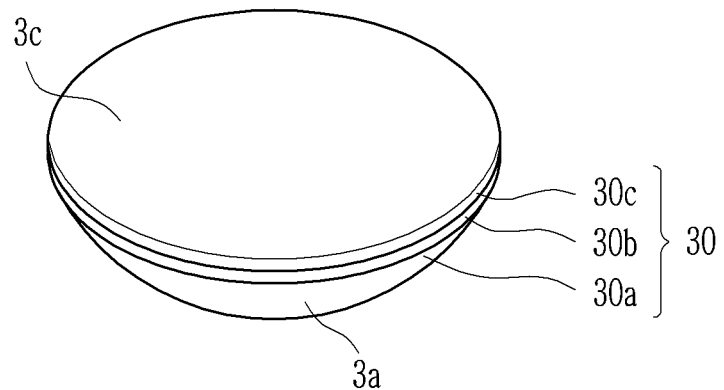

A structure for a display device and a display device including the same according to an exemplary embodiment will now be described with reference to FIG. 1 to FIG. 3C. FIG. 1 illustrates a schematic cross-sectional view of a display device according to an exemplary embodiment; FIG. 2 illustrates an exploded perspective view of the display device of FIG. 1; and FIGS. 3A, 3B, and 3C illustrate schematic top, cross-sectional, and perspective views, respectively, of a structure for the display device of FIG. 1.

Referring to FIG. 1 to FIG. 3C, a display device 1000 according to the present exemplary embodiment includes a display panel 10 for displaying an image, a window 20 covering a first surface 10*a* of the display panel 10, and a cover member 30 covering a second surface 10*b* of the display panel 10.

One surface of the display device 1000, at least some of which may have a curved surface, is not flat, and the other surface of the display device 1000, to which a driver 11 of the display device 1000 is attached, is flat.

The first surface 10*a* of the display panel 10 may have a convex shape in a first direction D, and the second surface 10*b* which is an opposite surface of the first surface 10*a* of the display panel 10 may have a concave shape in the first direction D. When the first surface 10*a* of the display panel 10 is viewed from above, the first surface 10*a* may have a convex shape in the first direction D, and when the second surface 10*b* of the display panel 10 is viewed from above, the second surface 10*b* may have a concave shape in the first direction D.

As such, the display panel 10 is not flat, and at least some of the display panel 10 may have a curved surface.

The first surface 10*a* of the display panel 10 is covered by the window 20, and the window 20 may have a convex exterior surface similar to the convex shape of the first surface 10*a* of the display panel 10. In an embodiment, although not shown, a touch panel and one or more additional layers such as an adhesive layer may be disposed between the display panel 10 and the window 20. In an embodiment, the display panel 10 may include the touch panel.

The cover member 30 includes a first layer 30*a*, a second layer 30*b*, and a third layer 30*c* that are sequentially stacked.

A driver 11 is connected to the display panel 10, and the driver 11 connected to the display panel 10 is attached to the third layer 30*c* of the cover member 30.

A third surface 3*a* of the first layer 30*a* of the cover member 30 has a convex shape corresponding to the concave shape of the second surface 10*b* of the display panel 10. Therefore, the convex third surface 3*a* of the cover member 30 can be inserted into and coupled to the concave second surface 10*b* of the display panel 10. A fourth surface 3*b*, which is an opposite surface of the third surface 3*a* of the first layer 30*a* of the cover member 30, is flat.

That is, the third surface 3*a* of the cover member 30 attached to the display panel 10 is not flat, like the display panel 10, and at least some of the third surface 3*a* of the cover member 30 may have a curved surface.

Since the second surface 10*b* of the display panel 10 and the third surface 3*a* of the cover member 30 facing each other have reverse shapes, they are not spaced apart from each other and are easily attached to each other.

Since the first layer 30*a* of the cover member 30 may have adhesion, it may be adhered to the second surface 10*b* of the display panel 10, and concurrently (e.g., simultaneously), it may be adhered to the second layer 30*b*. The second layer 30*b* of the cover member 30 includes an impact absorber. A fifth surface 3*c* of the third layer 30*c* contacting the cover member 30 is flat like the fourth surface 3*b* of the first layer 30*a* of the cover member 30. The third layer 30*c* of the cover member 30 has adhesion, and it may be adhered to the second layer 30*b*, and concurrently (e.g., simultaneously), the driver 11 connected to the display panel 10 may be adhered to the third layer 30*c* of the cover member 30. As such, the driver 11 connected to the display panel 10 is adhered and fixed to the fifth surface 3c of the third layer 30c of the cover member 30, and since the fifth surface 3c of the third layer 30c of the cover member 30 is flat, the driver 11 may be stably adhered and fixed thereto as compared with a case in which it is adhered to a surface having a concave or convex portion.

A flat shape of the cover member 30 is similar to a flat shape of the display panel 10. The flat shape of the cover member 30 of the shown display device according to the exemplary embodiment has a rounded edge like the flat shape of the display panel 10. However, the planer shapes of the display panel 10 and the cover member 30 are not limited thereto, and may be variously modified.

Now, a manufacturing method of a display device, such as the display device 1000 described above, according to an exemplary embodiment of the present invention will be described with reference to FIG. 4 to FIG. 7. FIG. 4 to FIG. 7 illustrate manufacturing methods of the display device according to the exemplary embodiment of FIG. 1.

Figure 4:
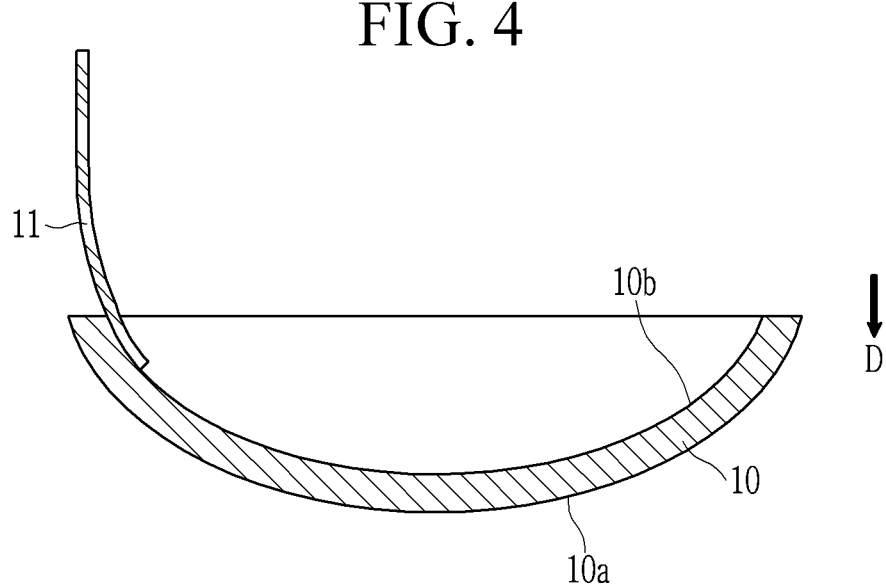
FIG. 4 to FIG. 7 illustrate manufacturing methods of a display device according to an exemplary embodiment.

Referring to FIG. 4, the display panel 10 is formed. The display panel 10 has the first surface 10a that is convex in the first direction D, and the second surface 10b that is opposite to the first surface 10a and concave in the first direction D. The driver 11 is connected to an end portion of the display panel 10. An image may be displayed on the first surface 10a of the display panel 10.

Figure 5:
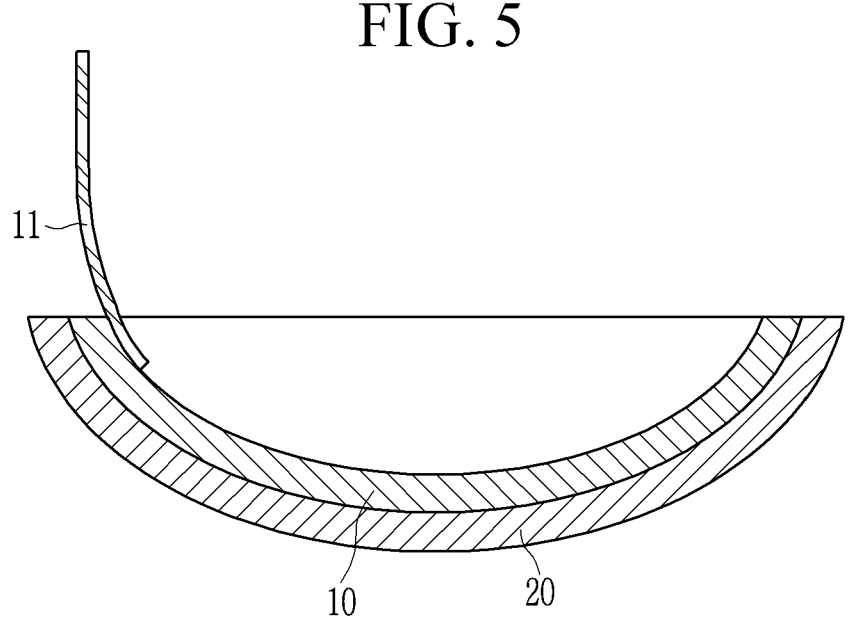

Referring to FIG. 5, the window 20 is attached to the first surface 10a of the display panel 10. Although not shown, one or more additional layers may be disposed between the display panel 10 and the window 20.

Figure 6:
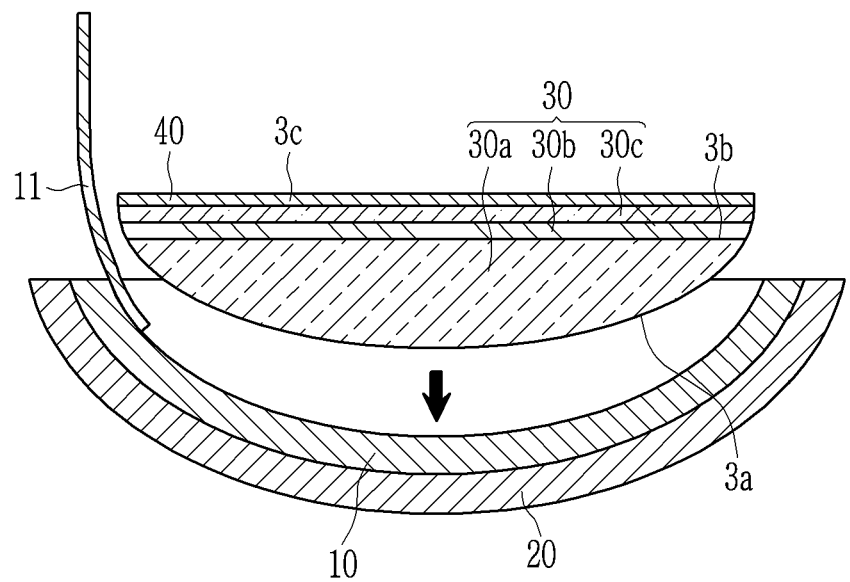

Referring to FIG. 6, the cover member 30 is disposed toward the second surface 10b of the display panel 10. In an embodiment, the cover member 30 includes the first layer 30a, the second layer 30b, and the third layer 30c that are sequentially stacked, and a passivation layer 40 is formed on the cover member 30. The third surface 3a of the first layer 30a of the cover member 30 has the convex shape corresponding to the concave shape of the second surface 10b of the display panel 10, and the fourth surface 3b that is an opposite surface of the third surface 3a of the first layer 30a is flat. The second layer 30b and the third layer 30c attached to the fourth surface 3b of the cover member 30 are also flat like the fourth surface 3b of the first layer 30a. Therefore, the fifth surface 3c of the third layer 30c of the cover member 30 is flat.

Figure 7:
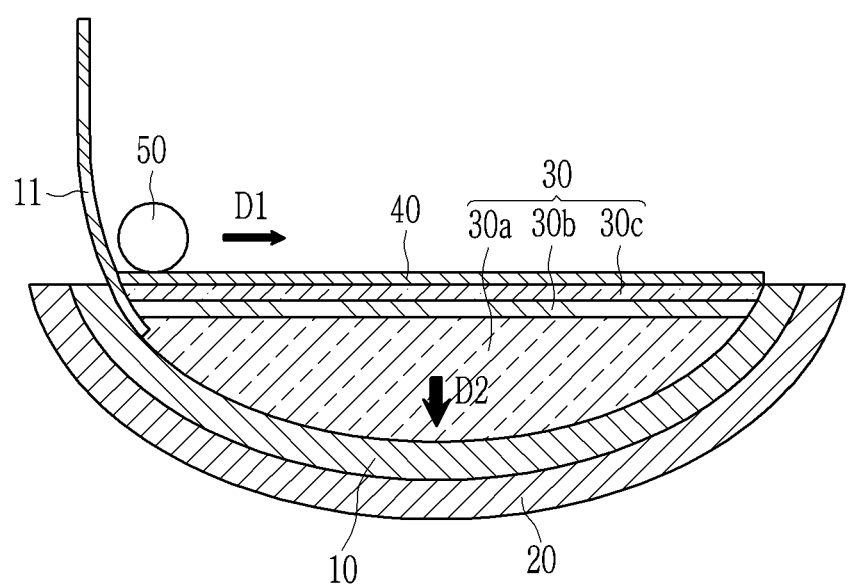

Referring to FIG. 7, in a state in which the cover member 30 is disposed on the second surface 10b of the display panel 10, by rotating a roller 50 in a second direction D1 to apply force to the cover member 30 in a third direction D2, the cover member 30 is attached to the display panel 10. In this case, the roller 50 rotates on the flat fifth surface 3c of the cover member 30 and, in an embodiment, it may rotate on an entire surface of the cover member 30 to apply force to the entire surface of the cover member 30, and thus the cover member 30 may be easily attached to the display panel 10. In addition, since the third surface 3a of the cover member 30 and the second surface 10b of the display panel 10 facing each other have reverse shapes; for example, since the third surface 3a of the cover member 30 has the convex shape corresponding to the concave shape of the second surface 10b of the display panel 10, they may be combined without lifting between the display panel 10 and the cover member 30.

Although not shown, the passivation layer 40 covering the cover member 30 attached to the display panel 10 may be eliminated, and the cover member 30 is bent toward the driver 11 connected to the display panel 10, and then the driver 11 is attached onto the cover member 30 as shown in FIG. 1. The driver 11 is adhered and fixed to the flat fifth surface 3c of the cover member 30.

As such, according to an exemplary embodiment, since the cover member 30 attached to the display panel 10 has the convex third surface 3a corresponding to the concave second surface 10b of the display panel 10, and the fifth surface 3c of the cover member 30 that is the opposite surface of the third surface 3a of the cover member 30 is flat, while the manufacturing process thereof is performed, the cover member 30 is attached to the entire surface of the second surface 10b of the display panel 10 without a space to be able to support and protect the display panel 10, and since the driver 11 of the display panel 10 is attached onto the flat fifth surface 3c of the cover member 30, the driver 11 may be well attached to the cover member 30 such that a position of the driving unit 11 may not be changed by an external impact. Therefore, the cover member 30 supports and protects the display panel 10, and the position of the driver is not changed by the external impact, and, thus, it is possible to prevent a contact defect between the display panel and the driver that may occur due to the external impact.

Figure 8:
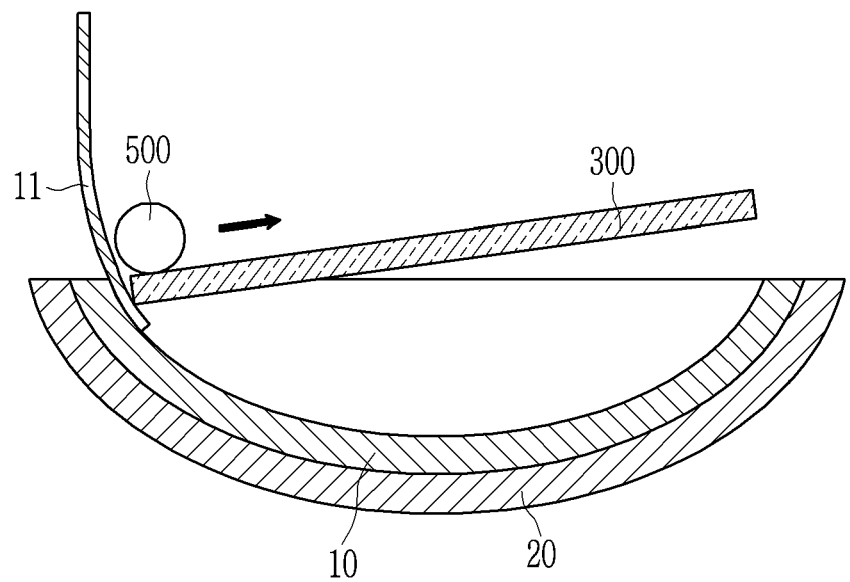
FIG. 8 and FIG. 9 illustrate manufacturing methods of a conventional display device.
Figure 9:
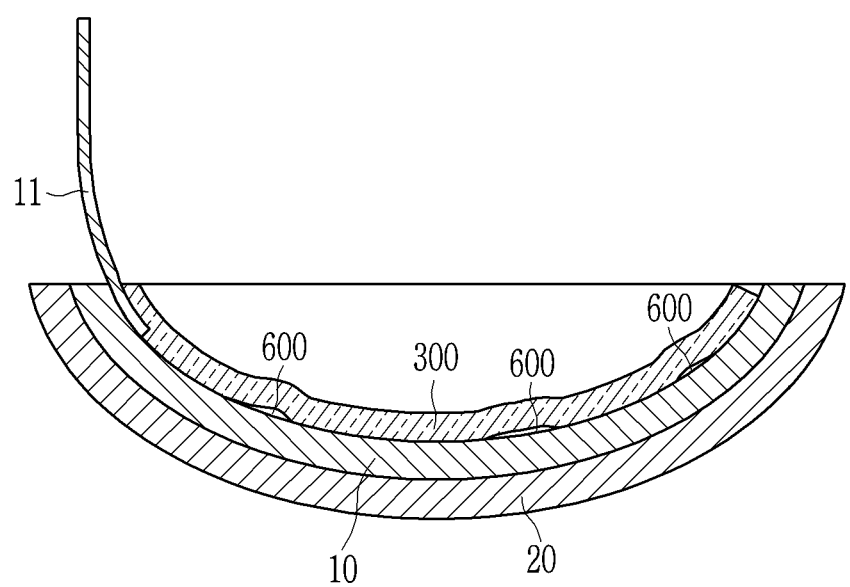

Now, a manufacturing method of a conventional display device will be described with reference to FIG. 8 and FIG. 9. FIG. 8 and FIG. 9 illustrate manufacturing methods of a conventional display device.

Referring to FIG. 8, the window 20 is attached to the display panel 10, a cover member 300 is disposed on the display panel 10, and then a roller 500 is rotated on the cover member 300. In this case, the surface of the display panel 10 adjacent to the cover member 300 has the concave shape, but since the cover member 300 is flat, it is difficult for the roller 500 to uniformly rotate along the concave shape and for a force of the roller 500 to be uniformly transferred, and, thus, it is difficult for the cover member 300 to be uniformly attached to the display panel 10.

Therefore, as shown in FIG. 9, a spacing portion 600 may be formed between the display panel 10 and the cover member 300, and an attachment force of the cover member 300 decreases due to the spacing portion 600, and, thus, it is difficult to support or protect the display panel 10. In addition, the surface of the cover member 300 may be uneven due to the spacing portion 600, such that the driver 11 is attached to the surface of the uneven cover member 300 and the combination force between the driver 11 and the cover member 300 decreases, and, thus, the position of the driver 11 may be easily changed by external impact. When the position of the driver 11 is changed or the driver 11 is damaged, a contact defect between the display panel and the driver may occur. This results in deterioration of display quality of the display panel 10.

As described above, according to the display device of the present exemplary embodiment, since the cover member 30 attached to the display panel 10 has the third surface 3a opposite to the second surface 10b of the display panel 10, and the fifth surface 3c of the cover member 30 that is the opposite surface of the third surface 3a of the cover member 30 is flat, the cover member 30 may be attached to the entire surface of the display panel 10 with a strong combination force to support and protect the display panel 10, and the attachment of the driver 11 to the cover member 30 is maintained, and, thus, the position of the driver 11 may not be changed due to the external impact.

Figure 10:
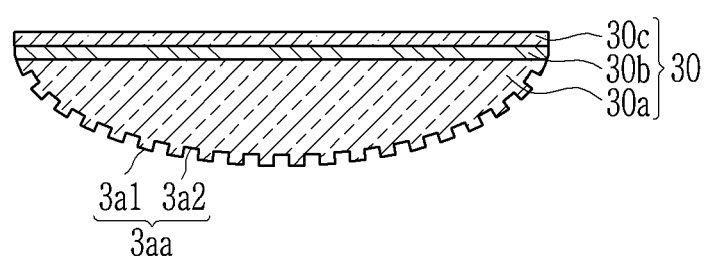
FIG. 10 illustrates a schematic cross-sectional view of a structure of a display device according to another exemplary embodiment.

Herein, a cover member for a display device according to another exemplary embodiment will be described with reference to FIG. 10. FIG. 10 illustrates a schematic cross-sectional view of a structure of a display device according to another exemplary embodiment.

Referring to FIG. 10, the cover member 30 for the display device according to the present exemplary embodiment is similar to the cover member for the display device according to the previously described exemplary embodiment. Further detailed description for the same constituent elements will be omitted.

Referring to FIG. 10, the cover member 30 for the display device according to the present exemplary embodiment is different from the cover member according to the previously described exemplary embodiment in that an embossed pattern is formed on a surface of the first layer 30a of the cover member 30 disposed to be adjacent to the display panel 10. The surface of the first layer 30a of the cover member 30 is provided with a first embossed pattern 3aa including a plurality of first convex portions 3a1 and a plurality of first concave portions 3a2. As such, since the surface of the first layer 30a of the cover member 30 is formed with the first embossed pattern 3aa, when the display panel 10 is attached to the cover member 30, bubbles that may occur at an interface between the display panel 10 and the cover member 30 are present in the first concave portions 3a2 of the first embossed pattern 3aa, and, thus, it is possible to prevent the display panel 10 and the cover member 30 from coming apart from each other because of the bubbles.

In addition, since the surface of the first layer 30a of the cover member 30 is formed with the first embossed pattern 3aa, when the surface of the first layer 30a of the cover member 30 is formed to not be flat but to have a curved surface, stress applied to the surface of the first layer 30a of the cover member 30 is reduced, and, thus, it is possible to easily form the surface of the first layer 30a of the cover member 30 as a curved type.

At least some of the third surface 3a of the cover member 30 is provided with a curved shape, a shape of the third surface 3a of the cover member 30 is opposite to a shape of the second surface 10b of the display panel 10 facing it, and the fifth surface 3c of the cover member 30 that is the opposite surface of the third surface 3a of the cover member 30 is flat. Therefore, the cover member 30 may be attached to the entire surface of the display panel 10 with a strong combination force to be able to support and protect the display panel 10, and the attachment of the driver 11 to the cover member 30 is maintained, and, thus, the position of the driver 11 may not be changed due to an external impact.

Aspects and features of the cover member of the display device according to the exemplary embodiment previously described with reference to FIG. 1 to FIG. 3 and FIG. 4 to FIG. 7 are applicable to the cover member of the display device according to the present exemplary embodiment.

Figure 11A:
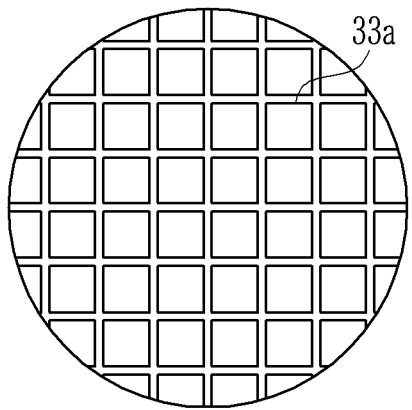
FIGS. 11A, 11B, and 11C illustrate examples of an embossed pattern of a structure of a display device according to some exemplary embodiments.
Figure 11B:
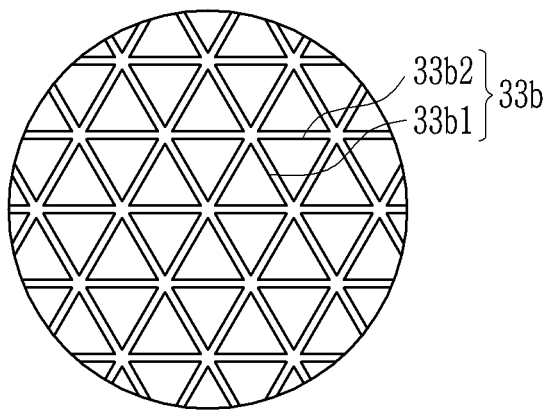
Figure 11C:
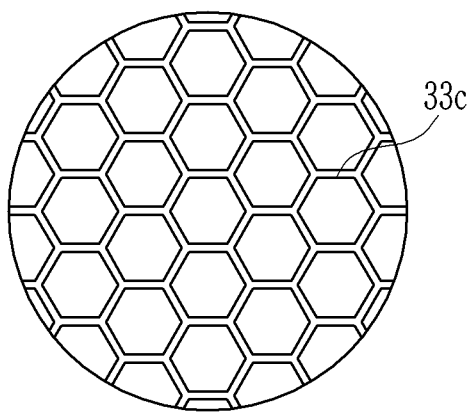

The embossed pattern formed on the first layer of the cover member will now be described with reference to FIG. 11A to FIG. 11C, together with FIG. 10. FIG. 11A to FIG. 11C illustrate examples of an embossed pattern of a structure of a display device according to some exemplary embodiments.

Referring to FIG. 11A, in an embodiment, flat shapes of the plurality of first convex portions 3a1 of the first embossed pattern 3aa formed on the surface of the first layer 30a of the cover member 30 include flat quadrangular shapes 33a. Thus, the plurality of first concave portions 3a2 of the first embossed pattern 3aa formed on the surface of the first layer 30a of the cover member 30 are formed along edges of the quadrangular shapes 33a.

Referring to FIG. 11B, in an embodiment, flat shapes of the plurality of first convex portions 3a1 of the first embossed pattern 3aa formed on the surface of the first layer 30a of the cover member 30 include a plurality of triangular shapes 33b including triangles 33b1 and inverted triangles 33b2. Thus, the plurality of first concave portions 3a2 of the first embossed pattern 3aa formed on the surface of the first layer 30a of the cover member 30 are formed along edges of the plurality of triangular shapes 33b.

Referring to FIG. 11C, in an embodiment, flat shapes of the plurality of first convex portions 3a1 of the first embossed pattern 3aa formed on the surface of the first layer 30a of the cover member 30 include a plurality of hexagonal shapes 33c. Thus, the plurality of first concave portions 3a2 of the first embossed pattern 3aa formed on the surface of the first layer 30a of the cover member 30 are formed along edges of the plurality of hexagonal shapes 33c.

As described above, since the first embossed pattern 3aa having the polygonal shape is formed on the surface of the first layer 30a of the cover member 30, when the cover member 30 is attached to the display panel 10, bubbles that may occur at an interface between the display panel 10 and the cover member 30 are present in the first concave portions 3a2 of the first embossed pattern 3aa, and, thus, it is possible to prevent the display panel 10 and the cover member 30 from coming apart from each other by the bubbles, and when the surface of the first layer 30a of the cover member 30 is formed to have a curved surface, stress applied to the surface of the first layer 30a of the cover member 30 is reduced, and, thus, it is possible to easily form the surface of the first layer 30a of the cover member 30 as a curved type.

Figure 12:
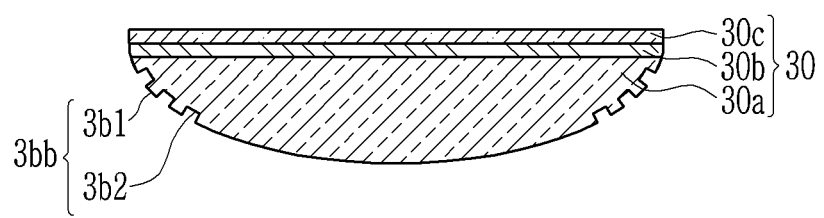
FIG. 12 illustrates a schematic cross-sectional view of a structure of a display device according to another exemplary embodiment.

A cover member for a display device according to another exemplary embodiment will now be described with reference to FIG. 12. FIG. 12 illustrates a schematic cross-sectional view of a structure of a display device according to another exemplary embodiment.

Referring to FIG. 12, the cover member 30 for the display device according to the present exemplary embodiment is similar to the cover members for the display device according to the previously described exemplary embodiments. Further detailed description for the same constituent elements will be omitted.

Referring to FIG. 12, the cover member 30 for the display device according to the present exemplary embodiment is different from the cover member according to the exemplary embodiment previously described with reference to FIG. 1 to FIG. 3 in that an embossed pattern is formed in the vicinity of an edge of the surface of the first layer 30a of the cover member 30 disposed to be adjacent to the display panel 10. The surface of the first layer 30a of the cover member 30 is provided with a second embossed pattern 3bb including a plurality of second convex portions 3b1 and a plurality of second concave portions 3b2. When the display panel 10 is attached to the cover member 30, bubbles may occur at a position at which the rotation of the roller ends. Since the cover member 30 for the display device according to the present exemplary embodiment is formed with the second embossed pattern 3bb at the vicinity of the edge of the first layer 30a of the cover member 30 in which bubbles are likely to occur, when the cover member 30 is attached to the display panel 10, the bubbles that may occur at an interface between the display panel 10 and the cover member 30 are present in the second concave portion 3b2 of the second embossed pattern 3bb, and, thus, it is possible to prevent the display panel 10 and the cover member 30 from coming apart from each other by the bubbles, and since an embossed pattern is not formed in a central portion of the surface of the first layer 30a of the cover member 30, the adherence thereof may be increased.

In addition, since some of the surface of the first layer 30*a* of the cover member 30 is formed with the second embossed pattern 3*bb*, when the surface of the first layer 30*a* of the cover member 30 is formed to have a curved shape, stress applied to the surface of the first layer 30*a* of the cover member 30 is reduced, and, thus, it is possible to easily form the surface of the first layer 30*a* of the cover member 30 as a curved type. In an embodiment, a flat shape of the second embossed pattern 3*bb* formed in some of the surface of the first layer 30*a* of the cover member 30 may be the same as any of those shown in FIG. 11A to FIG. 11C.

At least some of the third surface 3*a* of the cover member 30 has a curved shape, the shape of the third surface 3*a* of the cover member 30 is opposite to the shape of the second surface 10*b* of the display panel 10 facing it, and the fifth surface 3*c* of the cover member 30 that is the opposite surface of the third surface 3*a* of the cover member 30 is flat. Therefore, the cover member 30 may be attached to the entire surface of the display panel 10 with a strong combination force to be able to support and protect the display panel 10, and the attachment of the driver 11 to the cover member 30 is maintained, and, thus, the position of the driver 11 may not be changed due to an external impact.

Aspects and features of the cover member of the display device according to the exemplary embodiment previously described with reference to FIG. 1 to FIG. 3 and FIG. 4 to FIG. 7 are applicable to the cover member of the display device according to the present exemplary embodiment.

Figure 13A:
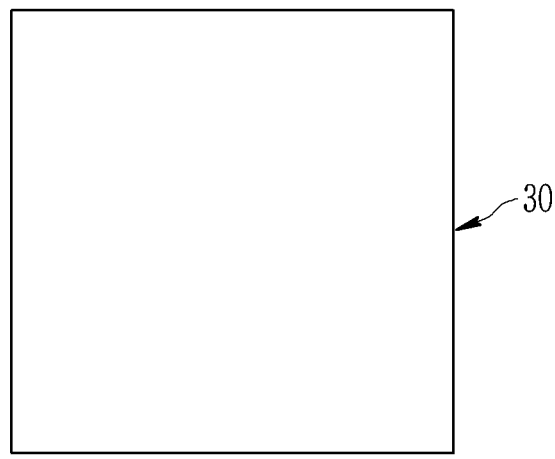
FIGS. 13A, 13B, and 13C illustrate schematic top, cross-sectional, and perspective views, respectively, of a structure of a display device according to another exemplary embodiment.
Figure 13B:
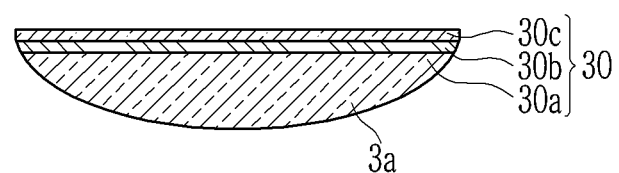
Figure 13C:
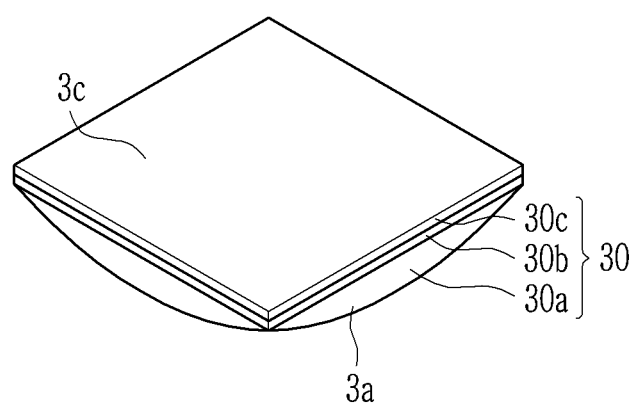

A cover member for a display device according to another exemplary embodiment will now be described with reference to FIG. 13A to FIG. 13C. FIGS. 13A, 13B, and 13C illustrate schematic top, cross-sectional, and perspective views, respectively, of a display device according to another exemplary embodiment.

Referring to FIG. 13A to FIG. 13C, the cover member 30 for the display device according to the present exemplary embodiment is similar to the cover members for the display devices according to the previously described exemplary embodiments. Further detailed description for the same constituent elements will be omitted.

Referring to FIG. 13A to FIG. 13C, the cover member 30 for the display device according to the present exemplary embodiment has a quadrangular flat shape. Although not shown, a flat shape of the display panel to which the cover member 30 is attached may be a quadrangular shape.

As described above, the cover member 30 for the display device according to an exemplary embodiment has the same shape as the flat shape of the display panel to which the cover member 30 is attached.

According to the shown exemplary embodiment, the cover member 30 has the quadrangular flat shape, but is not limited thereto, and may have any of other polygonal flat shapes.

At least some of the third surface 3*a* of the cover member 30 is provided with a curved shape, a shape of the third surface 3*a* of the cover member 30 is opposite to a shape of the second surface 10*b* of the display panel 10 facing it, and the fifth surface 3*c* of the cover member 30 that is the opposite surface of the third surface 3*a* of the cover member 30 is flat. Therefore, the cover member 30 may be attached to the entire surface of the display panel 10 with a strong combination force to be able to support and protect the display panel 10, and the attachment of the driver 11 to the cover member 30 is maintained, and, thus, the position of the driver 11 may not be changed due to an external impact.

Aspects and features of the display devices and the cover members according to the previously described exemplary embodiments are applicable to the cover member according to the present exemplary embodiment.

Figure 14:
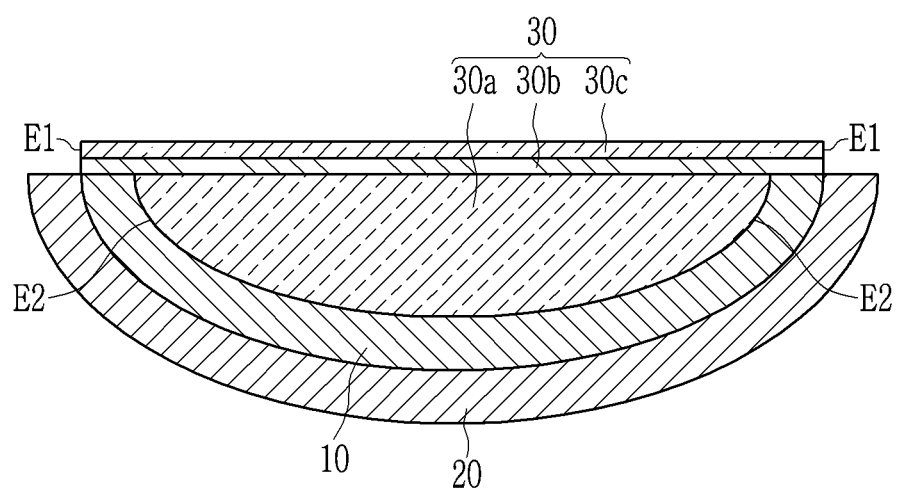
FIG. 14 illustrates a schematic cross-sectional view of a display device according to another exemplary embodiment.
Figure 15:
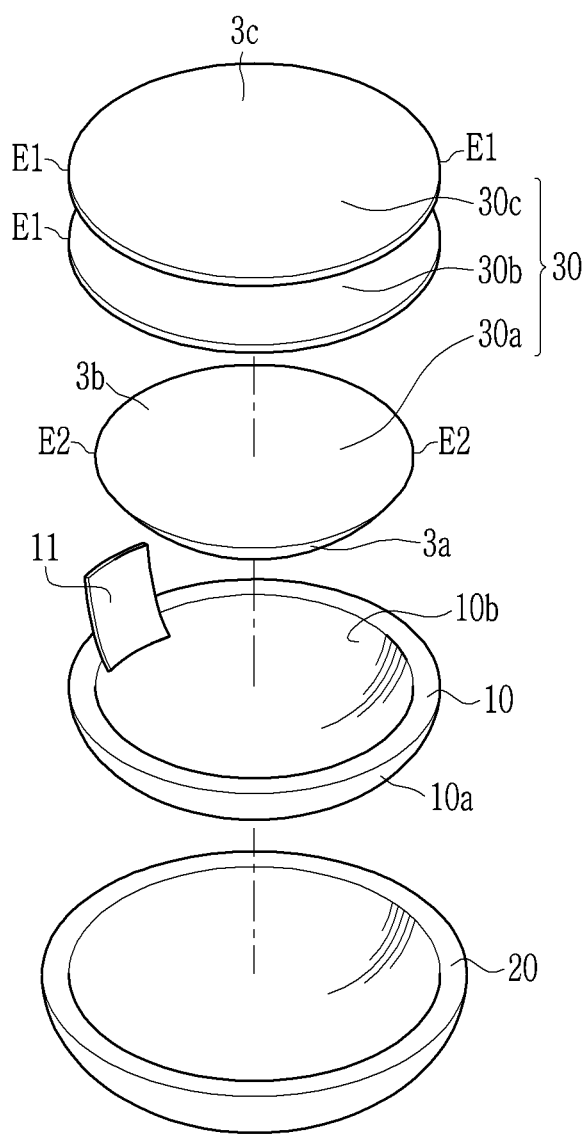
FIG. 15 illustrates an exploded perspective view of the display device of FIG. 14.
Figure 16A:
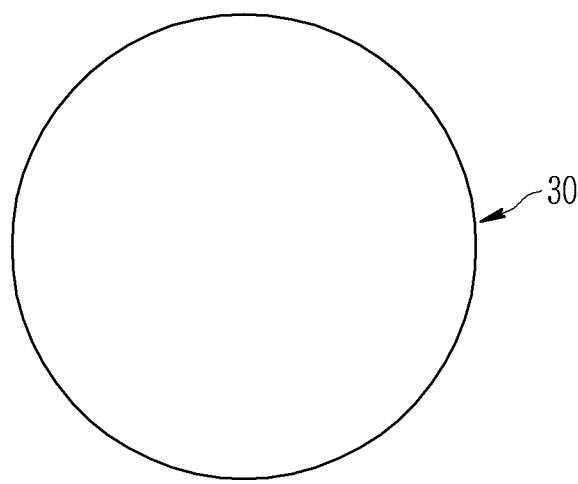
FIGS. 16A, 16B, and 16C illustrate schematic top, cross-sectional, and perspective views, respectively, of a structure of the display device of FIG. 14.
Figure 16B:
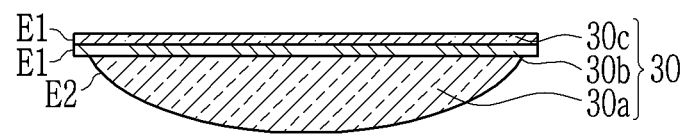
Figure 16C:
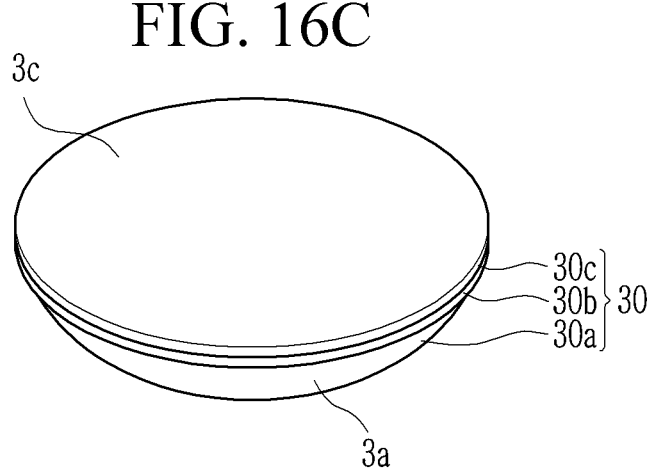

A display device and a cover member according to another exemplary embodiment will now be described with reference to FIG. 14 to FIG. 16C. FIG. 14 illustrates a schematic cross-sectional view of a display device according to another exemplary embodiment; FIG. 15 illustrates an exploded perspective view of the display device of FIG. 14; and FIGS. 16A, 16B, and 16C illustrate schematic top, cross-sectional, and perspective views, respectively, of a structure for the display device of FIG. 14.

Referring to FIG. 14 to FIG. 16C, a display device and a cover member according to the present exemplary embodiment are substantially similar to the display device and the cover member according to the exemplary embodiment previously described with reference to FIG. 1 to FIG. 3. Further detailed description for the same constituent elements will be omitted.

According to the present exemplary embodiment, the cover member 30 includes the first layer 30*a*, the second layer 30*b*, and the third layer 30*c* that are stacked, a first edge E1 of the second layer 30*b* and the third layer 30*c* protrudes more than a second edge E2 of the first layer 30*a*, and the second layer 30*b* and the third layer 30*c* cover an edge of the display panel 10. In the shown exemplary embodiment, an edge of the second layer 30*b* and an edge of the third layer 30*c* protrude more than an edge of the first layer 30*a* to cover the edge of the display panel 10, but the present invention is not limited thereto, and at least one of the edge of the second layer 30*b* and the edge of the third layer 30*c* may protrude more than the edge of the first layer 30*a* to cover the edge of the display panel 10. In an embodiment, for example, the edge of the second layer 30*b* protrudes more than the edge of the first layer 30*a* to cover the edge of the display panel 10, and the edge of the third layer 30*c* may overlap the edge of the first layer 30*a* so as to substantially coincide therewith. In an embodiment, although not shown, the edge of the second layer 30*b* and the edge of the third layer 30*c* may cover the edge of the display panel 10 and at least some of an edge of the window 20.

As such, since at least some of the layer of the cover member 30 covers and protects the edge of the display panel 10, it is possible to prevent or substantially prevent moisture or air from penetrating into the display panel 10 from the outside. As stated above, it is possible to prevent or substantially prevent moisture or air that may be penetrated from the outside, thereby preventing or substantially preventing damage to the display panel due to penetration of the moisture or the air.

In addition, since the cover member 30 attached to the display panel 10 has the third surface 3*a* having the convex shape corresponding to the concave shape of the second surface 10*b* of the display panel 10, and since the fifth surface 3*c* of the cover member 30 that is the opposite surface of the third surface 3*a* of the cover member 30 is flat, while the manufacturing process thereof is performed, the cover member 30 is attached to the entire surface of the second surface 10*b* of the display panel 10 without spacing to be able to support and protect the display panel 10, and since the driver 11 of the display panel 10 is attached onto the flat fifth surface 3*c* of the cover member 30, the driver 11 is well attached to the cover member 30, such that a position of the driving unit 11 is not changed by an external impact. Therefore, the cover member 30 supports and protects the display panel 10, and the position of the driver is not changed by the external impact, and, thus, it is possible to prevent a contact defect between the display panel and the driver that may occur due to the external impact.

Aspects and features of the display devices and the cover members according to the previously described exemplary embodiments are applicable to the display device and the cover member according to the present exemplary embodiment.

Figure 17:
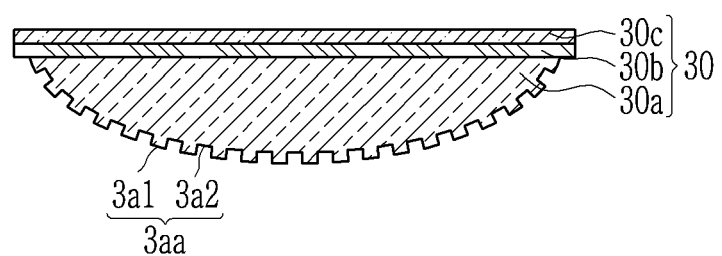
FIG. 17 illustrates a schematic cross-sectional view of a structure of a display device according to another exemplary embodiment.

A cover member for a display device according to another exemplary embodiment will now be described with reference to FIG. 17. FIG. 17 illustrates a schematic cross-sectional view of a structure of a display device according to another exemplary embodiment.

Referring to FIG. 17, the cover member 30 for the display device according to the present exemplary embodiment is similar to the cover member for the display device according to the previously described exemplary embodiment. Further detailed description for the same constituent elements will be omitted.

Referring to FIG. 17, the cover member 30 for the display device according to the present exemplary embodiment is different from the cover member according to the previously described exemplary embodiment in that an embossed pattern is formed on the surface of the first layer 30a of the cover member 30 disposed to be adjacent to the display panel 10. The surface of the first layer 30a of the cover member 30 is provided with the first embossed pattern 3aa including the plurality of first convex portions 3a1 and the plurality of first concave portions 3a2. As such, since the surface of the first layer 30a of the cover member 30 is provided with the first embossed pattern 3aa, when the cover member 30 is attached to the display panel 10, bubbles that may occur at the interface between the display panel 10 and the cover member 30 are present in the first concave portion 3a2 of the first embossed pattern 3aa, and, thus, it is possible to prevent the display panel 10 and the cover member 30 from coming apart from each other by the bubbles.

In addition, when the surface of the first layer 30a of the cover member 30 is formed to not be flat but to have a curved surface, stress applied to the surface of the first layer 30a of the cover member 30 is reduced, and, thus, it is possible to easily form the surface of the first layer 30a of the cover member 30 as a curved type.

Further, a flat shape of the first convex portion 3a1 of the first embossed pattern 3aa of the surface of the first layer 30a of the cover member 30 may be polygonal. In an embodiment, as shown in FIGS. 11A to 11C, a flat shape of the first convex portion 3a1 of the first embossed pattern 3aa of the surface of the first layer 30a may include the quadrangular shape 33a, the triangular shape 33b, or the hexagonal shape 33c, and a flat shape of the first concave portion 3a2 of the first embossed pattern 3aa of the surface of the first layer 30a of the cover member 30 is formed along the edge of the first convex portions 3a1 having the quadrangular shape 33a, the triangular shape 33b, or the hexagonal shape 33c.

At least some of the third surface 3a of the cover member 30 is provided with a curved shape, a shape of the third surface 3a of the cover member 30 is opposite to a shape of the second surface 10b of the display panel 10 facing it, and the fifth surface 3c of the cover member 30 that is the opposite surface of the third surface 3a of the cover member 30 is flat. Therefore, the cover member 30 may be attached to the entire surface of the display panel 10 with a strong combination force to be able to support and protect the display panel 10, and the attachment of the driver 11 to the cover member 30 is maintained, and, thus, the position of the driver 11 may not be changed due to an external impact.

Aspects and features of the cover members and the display devices according to the exemplary embodiments previously described with reference to FIG. 1 to FIG. 3 and FIG. 14 to FIG. 16 are applicable to the cover member and the display device according to the present exemplary embodiment.

Figure 18:
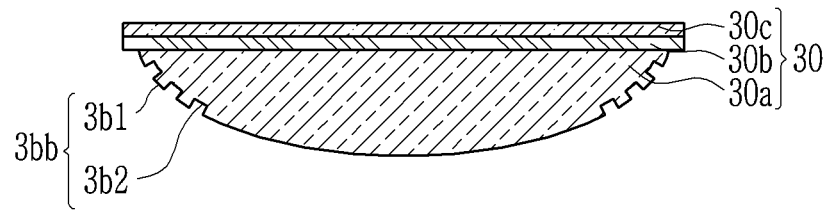
FIG. 18 illustrates a schematic cross-sectional view of a structure of a display device according to another exemplary embodiment.

A cover member for a display device according to another exemplary embodiment will now be described with reference to FIG. 18. FIG. 18 illustrates a schematic cross-sectional view of a structure of a display device according to another exemplary embodiment.

Referring to FIG. 18, the cover member 30 for the display device according to the present exemplary embodiment is similar to the cover members for the display devices according to the previously described exemplary embodiments. Further detailed description for the same constituent elements will be omitted.

Referring to FIG. 18, the cover member 30 for the display device according to the present exemplary embodiment is different from the cover member according to the exemplary embodiment described with reference to FIG. 14 to FIG. 16 in that an embossed pattern is formed in the vicinity of an edge of the surface of the first layer 30a of the cover member 30 disposed to be adjacent to the display panel 10. The surface of the first layer 30a of the cover member 30 is provided with the second embossed pattern 3bb including the plurality of second convex portions 3b1 and the plurality of second concave portions 3b2. When the display panel 10 is attached to the cover member 30, bubbles may occur at a position at which the rotation of the roller ends. Since the cover member 30 for the display device according to the present exemplary embodiment is formed with the second embossed pattern 3bb at the vicinity of the edge of the first layer 30a of the cover member 30 in which bubbles are likely to occur, when the cover member 30 is attached to the display panel 10, bubbles that may occur at an interface between the display panel 10 and the cover member 30 are present in the second concave portion 3b2 of the second embossed pattern 3bb, and, thus, it is possible to prevent the display panel 10 and the cover member 30 from coming apart from each other by the bubbles, and since an embossed pattern is not formed in a central portion of the surface of the first layer 30a of the cover member 30, the adherence thereof may be increased.

In addition, since some of the surface of the first layer 30a of the cover member 30 is formed with the second embossed pattern 3bb, when the surface of the first layer 30a of the cover member 30 is formed to not be flat but to have a curved surface, stress applied to the surface of the first layer 30a of the cover member 30 is reduced, and, thus, it is possible to easily form the surface of the first layer 30a of the cover member 30 as a curved type. In an embodiment, a flat shape of the second embossed pattern 3bb formed in some of the surface of the first layer 30a of the cover member 30 may be the same as any of those shown in FIG. 11A to FIG. 11C.

At least some of the third surface 3a of the cover member 30 is provided with a curved shape, a shape of the third surface 3a of the cover member 30 is opposite to a shape of the second surface 10b of the display panel 10 facing it, and the fifth surface 3c of the cover member 30 that is the opposite surface of the third surface 3a of the cover member 30 is flat. Therefore, the cover member 30 may be attached to the entire surface of the display panel 10 with a strong combination force to be able to support and protect the display panel 10, and the attachment of the driver 11 to the cover member 30 is maintained, and, thus, the position of the driver 11 may not be changed due to an external impact.

Many features of the cover member of the display device according to the exemplary embodiment previously described with reference to FIG. 1 to FIG. 3 and FIG. 14 to FIG. 16 are applicable to the cover member of the display device according to the present exemplary embodiment.

Figure 19A:
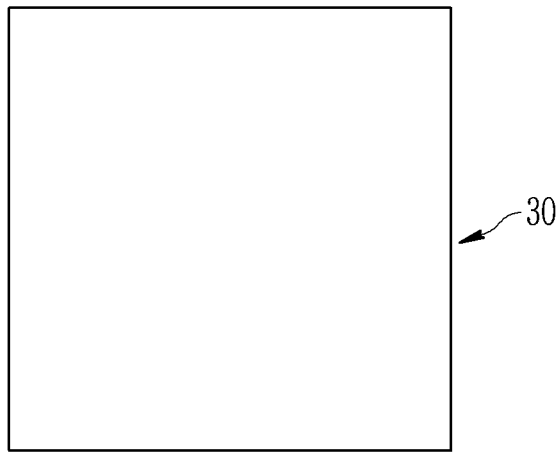
FIGS. 19A, 19B, and 19C illustrate schematic top, cross-sectional, and perspective views, respectively, of a structure of a display device according to another exemplary embodiment.
Figure 19B:
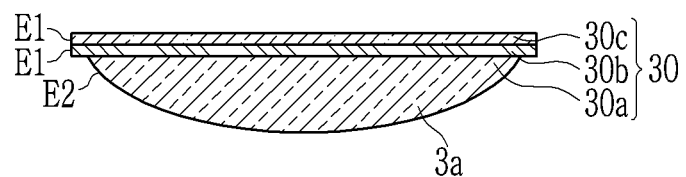
Figure 19C:
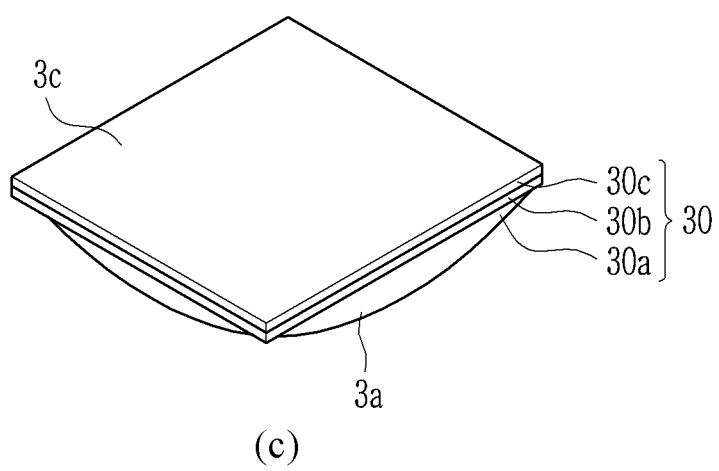

A cover member for a display device according to another exemplary embodiment will now be described with reference to FIG. 19A to FIG. 19C. FIGS. 19A, 19B, and 19C illustrate schematic top, cross-sectional, and perspective views, respectively, of a structure of a display device according to another exemplary embodiment.

Referring to FIG. 19A to FIG. 19C, the cover member 30 for the display device according to the present exemplary embodiment is similar to the cover members for the display devices according to the previously described exemplary embodiments. Further detailed description for the same constituent elements will be omitted.

Referring to FIG. 19A to FIG. 19C, the cover member 30 for the display device according to the present exemplary embodiment has a quadrangular flat shape. Although not shown, the flat shape of the display panel to which the cover member 30 is attached may also be quadrangular.

As described above, in an embodiment, the cover member 30 for the display device according to the exemplary embodiments has the same flat shape as the flat shape of the display panel to which the cover member 30 is attached.

According to the shown exemplary embodiment, the cover member 30 has the quadrangular flat shape, but is not limited thereto, and may have any of other polygonal flat shapes.

At least some of the third surface 3a of the cover member 30 is provided with a curved shape, a shape of the third surface 3a of the cover member 30 is opposite to a shape of the second surface 10b of the display panel 10 facing it, and the fifth surface 3c of the cover member 30 that is the opposite surface of the third surface 3a of the cover member 30 is flat. Therefore, the cover member 30 may be attached to the entire surface of the display panel 10 with a strong combination force to be able to support and protect the display panel 10, and the attachment of the driver 11 to the cover member 30 is maintained, and, thus, the position of the driver 11 may not be changed due to an external impact.

Aspects and features of the display devices and the cover members according to the previously described exemplary embodiments are applicable to the cover member according to the present exemplary embodiment.

While the present invention has been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A structure for a display device including a display panel having a convex shape in a first direction, comprising:
a first layer including a first surface and a second surface opposite the first surface, wherein the first surface has a convex shape in the first direction and the second surface is flat;
a second layer disposed on the second surface of the first layer according to a second direction opposite to the first direction and being flat; and
a third layer disposed on the second layer and being flat.

2. The structure for a display device of claim 1, wherein the first layer and the third layer have adherence.

3. The structure for a display device of claim 2, wherein at least a portion of the first surface of the first layer has a plurality of convex portions and a plurality of concave portions.

4. The structure for a display device of claim 3, wherein convex portions of the plurality of convex portions have a polygonal flat shape.

5. The structure for a display device of claim 4, wherein the convex portions have a triangular, quadrangular, or hexagonal flat shape.

6. The structure for a display device of claim 2, wherein an edge of at least one of the second layer and the third layer protrudes more than an edge of the first layer.

7. The structure for a display device of claim 1, wherein at least a portion of the first surface of the first layer has a plurality of convex portions and a plurality of concave portions.

8. The structure for a display device of claim 1, wherein an edge of at least one of the second layer and the third layer protrudes more than an edge of the first layer.

9. The structure for a display device of claim 8, wherein at least a portion of the first surface of the first layer has a plurality of convex portions and a plurality of concave portions.

10. The structure for a display device of claim 9, wherein convex portions of the plurality of convex portions have a polygonal flat shape.

11. The structure for a display device of claim 10, wherein the convex portions have a triangular, quadrangular, or hexagonal flat shape.

12. A display device comprising:
a display panel; and
a structure disposed on the display panel,
wherein a first surface of the display panel has a concave shape in a first direction,
the structure includes a second surface adjacent to the first surface of the display panel and the second surface has a convex shape corresponding to the concave shape of the first surface of the display panel in the first direction, and
the structure includes a third surface opposite the second surface, wherein the third surface is flat.

13. The display device of claim 12, wherein the concave shape of the display panel and the convex shape of the structure are combinable and opposite to each other.

14. The display device of claim 12, further comprising a driver connected to the display panel, wherein the driver contacts and is fixed to the third surface of the structure.

15. The display device of claim 14, wherein the structure includes a first layer including the second surface, a second layer disposed on the first layer, and a third layer disposed on the second layer and including the third surface, and
the first layer and the third layer have adherence.

16. The display device of claim 15, wherein at least a portion of the second surface of the first layer has a plurality of convex portions and a plurality of concave portions.

17. The display device of claim 16, wherein convex portions of the plurality of convex portions have a polygonal flat shape.

18. The display device of claim 17, wherein the convex portions have a triangular, quadrangular, or hexagonal flat shape.

19. The display device of claim 14, wherein
the structure includes a first layer including the second surface, a second layer disposed on the first layer, and a third layer disposed on the second layer and including the third surface, and
an edge of at least one of the second layer and the third layer protrudes more than an edge of the first layer.

20. A display device comprising:
a display portion comprising a display panel including a first surface and a structure attached to the display panel and including a second surface opposite the first surface, wherein the first surface has a convex shape, and the second surface is flat; and
a driver connected to the display portion and adhered and fixed to the second surface.

21. The display device of claim 20, wherein
the structure includes a first layer disposed on the display panel, a second layer disposed on the first layer, and a third layer disposed on the second layer and including the second surface, and
an edge of at least one of the second layer and the third layer protrudes more than an edge of the first layer to cover an edge of the display panel.

22. The display device of claim 21, wherein at least a portion of a surface of the first layer has a plurality of convex portions and a plurality of concave portions.

23. The display device of claim 22, wherein convex portions of the plurality of convex portions have a polygonal flat shape.

24. The display device of claim 23, wherein the convex portions have a triangular, quadrangular, or hexagonal flat shape.

* * * * *